US007569202B2

(12) United States Patent
Farrell et al.

(10) Patent No.: US 7,569,202 B2
(45) Date of Patent: *Aug. 4, 2009

(54) SILICON NANOSPONGE PARTICLES

(75) Inventors: Declan Farrell, Dun Laoghaire (IE); Santosh Y Limaye, El Cajon, CA (US); Shanthi Subramanian, San Diego, CA (US)

(73) Assignee: Vesta Research, Ltd. (IE)

( * ) Notice: Subject to any disclaimer, the term of this patent is extended or adjusted under 35 U.S.C. 154(b) by 463 days.

This patent is subject to a terminal disclaimer.

(21) Appl. No.: 11/381,755

(22) Filed: May 5, 2006

(65) Prior Publication Data

US 2006/0251561 A1    Nov. 9, 2006

Related U.S. Application Data

(60) Provisional application No. 60/678,979, filed on May 9, 2005.

(51) Int. Cl.
  *C01B 33/02*  (2006.01)
  *B32B 5/32*   (2006.01)

(52) U.S. Cl. .................... 423/348; 423/349; 423/350; 428/402

(58) Field of Classification Search ............. 423/348, 423/349, 350; 428/402, 404, 405
See application file for complete search history.

(56) References Cited

U.S. PATENT DOCUMENTS

| 4,755,368 | A  | * | 7/1988  | Ulrich et al. ............... 423/337 |
| 5,695,617 | A  | * | 12/1997 | Graiver et al. ......... 204/157.41 |
| 6,491,929 | B1 |   | 12/2002 | Anderson |
| 6,666,214 | B2 |   | 12/2003 | Canham |
| 6,770,480 | B1 |   | 8/2004  | Canham |
| 6,803,244 | B2 |   | 10/2004 | Diener et al. |
| 6,984,274 | B2 |   | 1/2006  | Hofmann et al. |
| 7,049,259 | B1 | * | 5/2006  | Deckman et al. ............... 502/4 |
| 7,244,513 | B2 | * | 7/2007  | Li et al. ..................... 428/613 |
| 7,371,666 | B2 | * | 5/2008  | Swihart et al. ............. 438/507 |
| 2002/0034646 | A1 |   | 3/2002 | Canham |
| 2002/0068419 | A1 |   | 6/2002 | Sakaguchi |
| 2003/0148008 | A1 |   | 8/2003 | Robinovitch |
| 2004/0010313 | A1 | * | 1/2004 | Aston et al. ............. 623/17.11 |

(Continued)

FOREIGN PATENT DOCUMENTS

EP    0206795 A2    12/1986

(Continued)

OTHER PUBLICATIONS

R.W. Fathauer et al., Visible Luminescence from Silicon Wafers Subjected to Stain Etches; Appl. Phys. Lett.; Feb. 24, 1992; pp. 995-997; vol. 60 (8); American Institute of Physics; US.

(Continued)

*Primary Examiner*—Roy King
*Assistant Examiner*—Xiaobei Wang
(74) *Attorney, Agent, or Firm*—Joy L. Bryant

(57) ABSTRACT

Silicon nanosponge particles prepared from a metallurgical grade silicon powder having an initial particle size ranging from about 1 micron to about 4 microns is presented. Each silicon nanosponge particle has a structure comprising a plurality of nanocrystals with pores disposed between the nanocrystals and throughout the entire nanosponge particle.

43 Claims, 5 Drawing Sheets

U.S. PATENT DOCUMENTS

| | | | |
|---|---|---|---|
| 2004/0052865 A1 | 3/2004 | Gower | |
| 2004/0161369 A1 | 8/2004 | Chan | |
| 2004/0166319 A1 | 8/2004 | Li | |
| 2004/0191320 A1* | 9/2004 | Canham et al. | 424/489 |
| 2004/0244889 A1 | 12/2004 | Sailor | |
| 2004/0266050 A1* | 12/2004 | Benzel et al. | 438/53 |
| 2007/0269411 A1* | 11/2007 | Sun et al. | 424/93.2 |
| 2008/0102036 A1* | 5/2008 | Poss et al. | 424/9.6 |
| 2008/0230781 A1* | 9/2008 | Numasawa et al. | 257/52 |

FOREIGN PATENT DOCUMENTS

| | | |
|---|---|---|
| EP | 0341923 A2 | 11/1989 |
| EP | 1231259 A2 | 8/2002 |
| WO | WO0144140 A1 | 6/2001 |

OTHER PUBLICATIONS

A.N. Parbukov et al., The Production of a Novel Stain-Etched Porous Silicon, Metallization of the Porous Surface and Application in Hydrocarbon Sensors; Materials Science and Engineering; 2001; pp. 121-123; vol. C 15; Elsevier Science B.V.

E. Vazsonyi et al., Porous Silicon Formation by Stain Etching; Thin Solid Films; 2001; pp. 295-302; vol. 388; Elsevier Science B.V.

L.T. Canham, Silicon Quantum Wire Array Fabrication by Electrochemical and Chemical Dissolution of Wafers; Sep. 3, 1990; pp. 1046-1048; vol. 57(10); Appl. Phys. Lett.

A.J. Stecki et al., Photoluminescence from Stain-Etched Polycrystalline Si Thin Films; Apr. 26, 1993; pp. 2111-2113; vol. 62(17); Appl. Phys. Lett.

Michael T. Kelly et al., High Efficiency Chemical Etchant for the Formation of Luminescent Porous Silicon; Mar. 28, 1994; pp. 1693-1695; vol. 64(13); Appl. Phys. Lett.

Chi-Woo Lee, Buem-Suck Kim, Dong-Il Kim, Nam-Ki Min and Suk-In Hong, "Photoluminescence from nano porous silicon prepared by photoelectrochemical etching of n-type single crystalline silicon," Mat. Res. Soc. Symp. Proc., 2001, pp. F.5.29.1-F.5.29.6, vol. 638, Materials Research Society.

* cited by examiner

SILICON NANOSPONGE PARTICLES

CROSS-REFERENCE TO RELATED APPLICATIONS

This application claims the benefit of U.S. Provisional Patent Application Ser. No. 60/678,979, entitled, "Silicon Nanosponge Particles, Articles and Method Relating Thereto," filed May 9, 2005, which is hereby incorporated by reference in its entirety.

FIELD OF THE INVENTION

The present invention is related to porous silicon. In particular, it is related to silicon nanosponge particles prepared from metallurgical grade silicon powder, each particle comprising a plurality of nanocrystals with pores disposed between the nanocrystals and throughout the entire particle.

BACKGROUND OF THE INVENTION

The anodization of single crystalline silicon wafers in hydrofluoric acid (HF)-ethanol solutions, results in the formation of pores along certain crystal orientations <100>. This form of silicon is known as porous silicon and is typically formed by immersing a single crystalline wafer in an HF-ethanol electrolyte and applying a positive potential. Porous silicon formed by electrochemical etching is usually in the form of a single layer on a single crystalline wafer. Depending on the etching conditions, pore sizes can range from nanometers to tens of micrometers. Porous silicon is classified as either macroporous (pore diameter d>50 nm), mesoporous (2 nm<d<50 nm) or microporous (d<2 nm). Microporous silicon is also referred to as nanoporous silicon. In order to prepare porous silicon powder from porous silicon layers formed on single crystalline wafers, the porous layer must be detached and further agitated to create porous particles. This process has several drawbacks and limitations. During the processes of drying the porous layer and agitation, the silicon structure is likely to crack. Also, the yield of porous silicon (48% porosity) from a 4 inch diameter wafer, created by anodizing for 5 minutes at a growth rate of 1.3 microns/minute, is only 0.7% per gram of starting material. Next, scale-up of this process is difficult because the yield of porous silicon from the process is limited by the diameter of the silicon wafers. In addition, there are many challenges in scaling up electrochemical etching processes to large diameter wafers. Some of these challenges include: the difficulty in achieving a safe and reliable cell design for withstanding extremely corrosive chemicals; making an ohmic contact over the back side of the wafer in order to ensure uniform etching; controlling flow of the electrolyte across the wafer for uniform current density; and the general cost of large diameter silicon wafers. It is for these reasons that there is a need for a low cost and reliable production method capable of producing large quantities of porous silicon particles.

Li et al. (US Patent Application Publication No. US2004/0166319) describe a porous silicon powder comprising individual silicon particles wherein only the outermost layer of each individual particle is porous. In particular, the porous layer has a maximum thickness of only 500 nm (0.5 microns). In making these particles, a stain etch method is employed. A porous silicon powder is subjected to ultrasonic agitation to yield individual silicon nanoparticles. This process allows for using powders instead of single crystalline silicon wafers, enabling etching of a much higher surface area per gram of the material. In addition, this process can produce nanoparticles doped with any type of dopant (n-type, p-type, etc.) if appropriately-doped silicon is used as a precursor material. Examples of various known dopants include arsenic (As), gallium (Ga), phosphorus (P), boron (B), antimony (Sb), erbium (Er), and combinations thereof. Stain-etching is typically performed in an aqueous mixture of hydrofluoric and nitric acids. The reaction process can be described as:

$$Si + 2h^+ \rightarrow Si^{2+} \text{(hole injection)}$$

$$HNO_3 + HNO_2 + H_2O \leftrightarrow 2HNO_2 + 2OH^-$$

$$Si^{2+} + 2OH^- \rightarrow Si(OH)_2$$

$$Si(OH)_2 + 6HF \rightarrow H_2SiF_6 + 2H_2O + H_2$$

The regeneration of $HNO_2$ makes the reaction autocatalytic and the etching rate depends upon the amount of $NO_2$ formed in the reaction:

$$HNO_3 + HNO_2 \leftrightarrow 2NO_2 + H_2O.$$

Thus, the process is limited by the presence of $HNO_2$ at the surface of the silicon sample. In order to make silicon nanoparticles, the porous silicon powder is ultrasonically agitated in a suitable solvent which causes the porous outermost layers to break up and be dispersed into the solvent. Hence, a mechanical action between the porous silicon layers of the powder and cavitation bubbles induced by ultrasonic agitation result in the generation of individual silicon nanoparticles. However, in all instances, the resulting silicon nanoparticles must be separated from the remnants of the larger silicon particles and the porosity is limited to a maximum thickness of only 500 nm (0.5 microns).

An object of the present invention is to provide silicon nanosponge particles wherein each particle is comprised of a plurality of nanocrystals with pores disposed between the nanocrystals and throughout the entire nanosponge particle.

Another object of the present invention is to provide a method for producing silicon nanosponge particles from a metallurgical grade silicon powder.

SUMMARY OF THE INVENTION

Silicon nanosponge particles are prepared from a metallurgical grade silicon powder. The metallurgical grade silicon powder has an initial particle size ranging from about 1 micron to about 4 microns. The metallurgical grade silicon powder is treated to yield silicon particles having a particle size ranging from about 0.1 microns to about 40 microns. The silicon particles are separated to isolate the silicon particles having sizes ranging from about 1 micron to about 4.0 microns. The isolated silicon particles are etched to yield silicon nanosponge particles. The silicon nanosponge particles are unique in that each particle comprises a plurality of nanocrystals with pores disposed between the nanocrystals and throughout the entire nanosponge particle. These unique, completely porous silicon nanosponge particles differ from the individual etched particles found in the prior art because porosity is not limited only to the surface of the particle but penetrates throughout the particle and there is no solid core beneath the porous surface. The completely porous or nanosponge structure of each particle enables the silicon nanosponge particles of the present invention to be useful as a carrier material for a broad range of applications such as catalysts and drugs, adsorbents, sensors, explosives, photosensitizers, precursors for high surface area forms of ceramics such as $SiC$ and $Si_3N_4$ and as electrodes in fuel cells. The nanosponge material may also be broken down through various milling processes to yield discrete nanocrystal particles useful as intermediates for other applications.

Additional objects and advantages of the invention will be set forth in part in the description which follows, and in part, will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principals thereof, and in which.

DETAILED DESCRIPTION OF THE PREFERRED EMBODIMENTS

Figure 1:
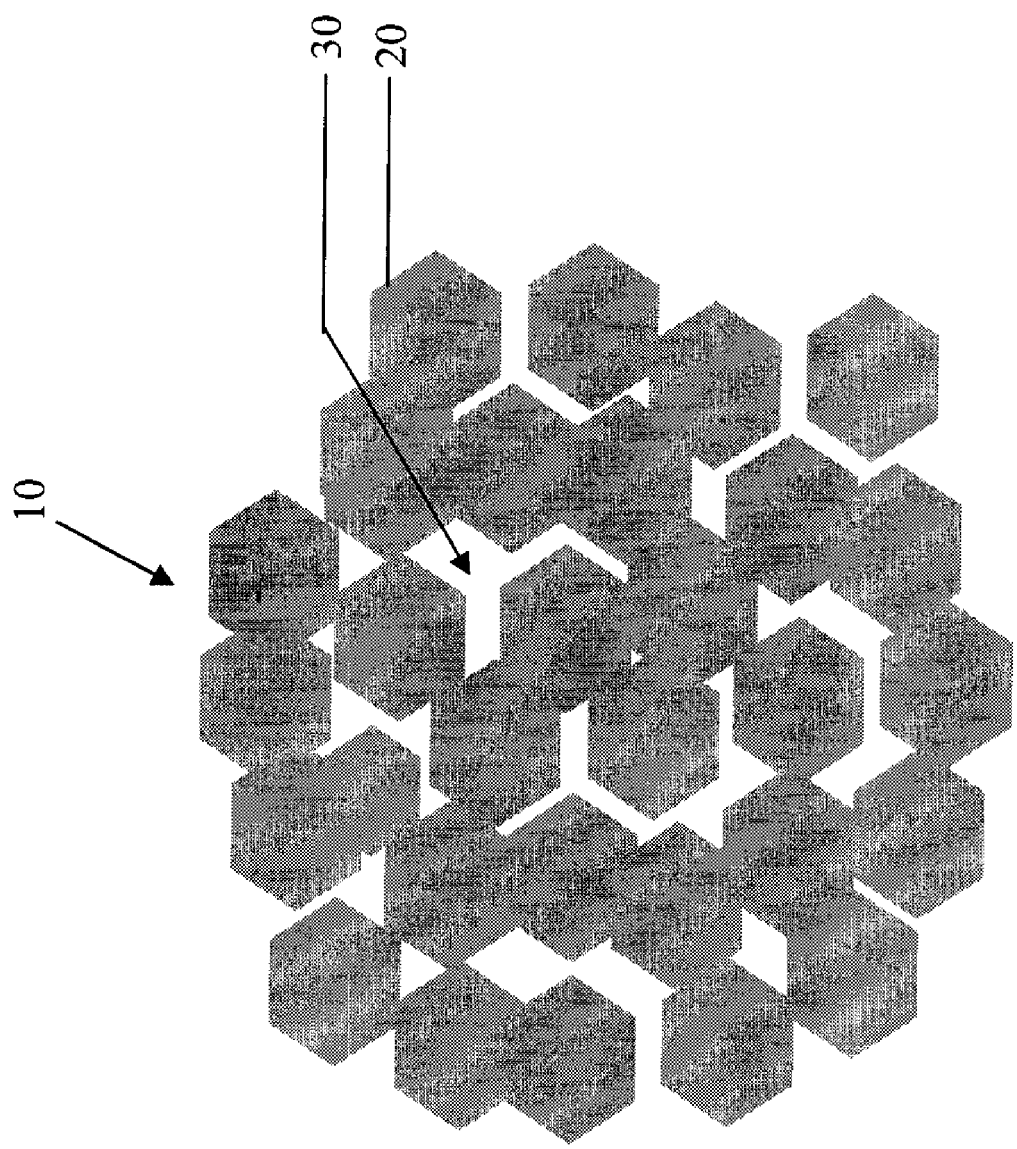
FIG. 1 is a schematic representation of a porous silicon nanosponge particle of the present invention.

The present invention is directed towards silicon nanosponge particles prepared from a metallurgical grade silicon powder. The metallurgical grade silicon powder has an initial particle size ranging from about 1 micron to about 4 microns. Referring now to FIG. 1, a silicon nanosponge particle 10 of the present invention is depicted. It is important to note that the silicon nanosponge particles 10 of the present invention are distinguished from the silicon particles found in the prior art in several ways. First, the porosity of the nanosponge particles is not restricted to the surface of each individual particle. Rather, each silicon nanosponge particle 10 of the present invention comprises a plurality of nanocrystals 20 with pores 30 disposed between the nanocrystals and throughout the entire nanosponge particle which gives the particle a sponge-like structure.

As an additional embodiment of the invention, the nanosponge particles are surface treated such that the silicon nanosponge particles have at least one surface functional group. Such surface treatment includes but is not limited to treating with an organic or inorganic compound or element. Any compound, element, or process known to one of ordinary skill in the art may be used and, preferably, the surface functional group is selected from the group consisting of: hydrogen, oxygen, a halogen, alkenyl, alkyl, organoamine, alkoxy, ester, aldehyde, ketone, carboxylate, and an aryl group and combinations thereof. Surface functional groups enable the nanosponge particles to be suitable for a broad range of applications—from drug delivery to explosives.

Figure 2:
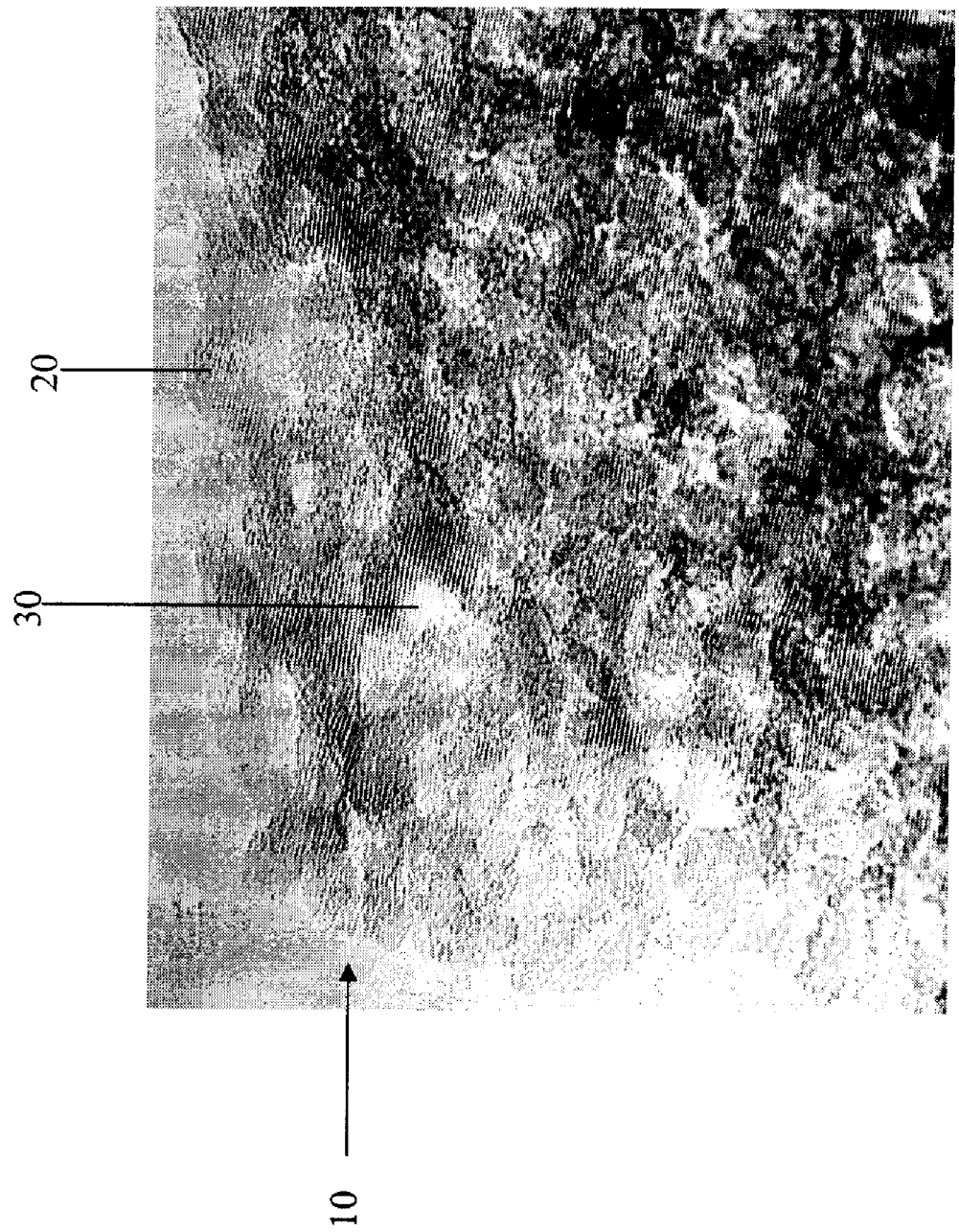
FIG. 2 is a transmission electron micrograph of a porous silicon nanosponge particle of the present invention.

FIG. 2 is a high resolution transmission electron micrograph (TEM) image of a silicon nanosponge particle 10 of the present invention. The image shows nanocrystals 20 within the silicon nanosponge particle. Disposed between the nanocrystals and throughout the entire nanosponge particle are pores. These pores may be of varying size and have an average pore diameter ranging from about 2.0 nm to about 8.0 nm as calculated from nitrogen adsorption isotherm data using the Barret-Joyner-Halenda scheme. The lattice fringes correspond to Si 111 planes and indicate that the nanocrystals are crystalline.

The ability to form silicon nanosponge particles resides in the starting material used to produce the nanosponge particles. The nanosponge particles of the present invention are prepared from a metallurgical grade silicon powder having an initial particle size ranging from about 1 micron than about 4 microns. For the purpose of this patent application and the claims, metallurgical grade silicon powder is defined as powder produced from the raw silicon product of a silicon smelting and grinding process whereby the raw silicon product has not been further refined to make the silicon suitable for electronic, semi-conducting, and photovoltaic applications. In other words, various impurities from the smelting and grinding process remain within the silicon powder as used. It has been discovered that the impurities in the metallurgical grade silicon powder impart certain benefits to the silicon nanosponge material making process. In particular, since the impurities are susceptible to preferential etching relative to the rate of etching of silicon, the impurities are etched at a faster rate, thus enabling the formation of nanopores throughout the entire silicon particle, instead of restricting etching to the surface. Any metallurgical grade silicon powder known to one of ordinary skill in the art may be employed for the present invention. For the purpose of this application and the appended claims, metallurgical grade silicon powders are defined as those powders which are comprised of, at a minimum, Si, Fe, Al, and Ca. In particular, typical metallurgical grade silicon powders suitable for the present invention have the compositions of those shown in Table 1.

TABLE 1

| Element | Weight Percent |
|---------|----------------|
| Si      | 98.6-99.00     |
| Fe      | 0.03-0.50      |
| Al      | 0.05-0.2       |
| Ca      | 0.00-0.08      |
| C       | 0.00-0.15      |
| $O_2$   | 0.2-1.0        |

These powders are known as 2E, 2F and 4E, 4F and are commercially available from Vesta Ceramics, AB in Sweden. Preferably, the resulting porous silicon nanosponge particles comprise silicon and aluminum. Most preferably, the resulting porous silicon nanosponge particles comprise silicon at a concentration ranging from about 99% by weight to about 100% by weight and aluminum at a concentration ranging from about 0% by weight to about 1% by weight. It is understood in the art that the resulting porous silicon nanosponge particles may also contain trace amounts of iron, aluminum and calcium or other trace elements that may have been present in the metallurgical grade silicon powder used to fabricate the particles.

The porous silicon nanosponge material is prepared by providing a metallurgical grade silicon powder having a particle size ranging from about 1 mm to about 3 mm. The metallurgical grade silicon powder is treated to yield silicon particles have a particle sizes ranging from about 0.1 microns to about 40 microns as measured by laser diffraction. Any method of treatment known to one of ordinary skill in the art may be used to obtain particle sizes within the range and a preferred method of treatment of the silicon powder is jet milling the silicon powder. The silicon particles are then separated to isolate the silicon particles having a particle size ranging from about 1 micron to about 4.0 microns. The isolated silicon particles are etched to yield the porous silicon nanosponge particles of the present invention.

In etching the isolated silicon particles, any etching method known to one of ordinary skill in the art may be employed. One preferred method of etching is stain etching. There are several known stain etching methods such as those described by Fauther et al. in *Appl. Phys. Lett.*, Vol. 60, No. 8, p. 24, 1992; E. Vazsonyi et al., *Thin Solid Films*, Vol. 388, pp. 295-302, 2001; and Prabukov et al., *Materials Science and Engineering*, Vol. C 15, pp. 121-123, 2001 the references are incorporated herein and summarized as follows. The various etchant compositions from these references are summarized in Table 2.

TABLE 2

| Etchant Composition | Reference |
|---|---|
| $HF:HNO_3:H_2O$ | Fauther |
| 2 g $NaNO_2$ in 100 ml HF | Fauther |
| 0.2 g $CrO_3$ in 100 ml HF | Fauther |
| $HF:HNO_3:H_2O + NaNO_2$ | Vazsonyi |
| Fluoroboric acid/hexafluorosilicic/ heaxafluoroantimonic/hexafluorotitanic/ hexafluorophosphoric acids + nitric acid | Prabukov |

The preferred stain etching composition of the present invention is that comprising a solution of $HF:HNO_3:H_2O$ at a ratio ranging from about 4:1:20 to about 2:1:10 by weight. The advantage to using this process was found that there is no application of an electrical potential. It was also discovered that the nanocrystal size is controlled or determined by the amount of $HNO_3$ used in the process. By varying the concentration of nitric acid ($HNO_3$) added to the process and allowing the reaction to go to completion, the amount of silicon removed from the particle, the overall porosity and nanocrystal size can be controlled. Once the particles have been subjected to the etching process, they are collected and dried, leaving porous silicon nanosponge particles where each particle comprises a plurality of nanocrystals with pores disposed between the nanocrystals and throughout the entire nanosponge particle.

Figure 3:
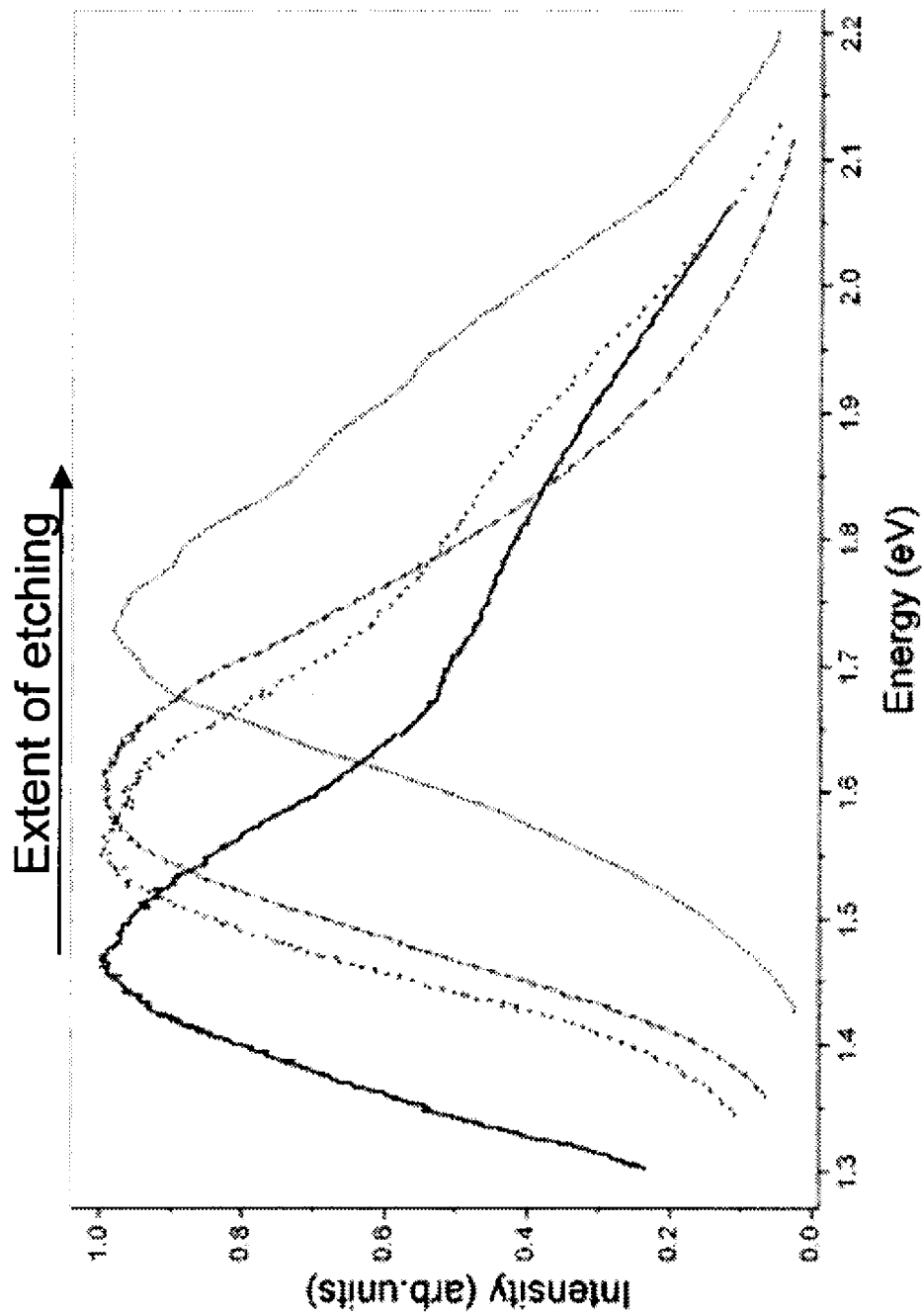
FIG. 3 provides the photoluminescence data from different silicon nanosponge particles obtained by varying the nitric acid concentration during the etching process.

An alternative etching process is that of vapor phase etching. Vapor phase etching involves etching the particles with moist air saturated with $HF/HNO_3$ vapors. As was discussed above, the extent of etching directly affects the nanocrystal size and is controlled by varying the nitric acid concentration. The maximum in the photoluminescence spectrum is determined by the nanocrystal size. FIG. 3 provides the photoluminescence data from varying the nitric acid concentration and the extent of etching for the silicon nanosponge particles and shows how the nanocrystal size is controlled by the extent of etching. The measurements were conducted by excitation with an Argon ion laser with an excitation energy of 2.54 eV. Photoluminescence was detected using a CCD camera. The photoluminescence peak shifts to higher energies as more material is etched and the nanocrystal size becomes smaller.

Another embodiment comprises illumination of the isolated silicon particles during etching. Any means of illumination known to one of ordinary skill in the art may be employed. Preferably, illumination occurs at a wavelength selected from the group consisting of: near infrared, visible, near ultraviolet, far ultraviolet, and extreme ultraviolet radiation. In addition, it was found that the nanocrystal size is controlled based on the both the length of time the isolated particles are exposed to illumination and the illumination wavelength. In essence, by controlling the exposure time and illumination wavelength, the porosity in the nanosponge may be controlled (either by allowing for larger sized nanocrystals and smaller sized pores or by having smaller sized nanocrystals and larger sized pores).

As an alternative embodiment, the pore size of each silicon nanosponge particle is controlled by post-etching the nanosponge particles with a 50% by weight hydrofluoric acid-ethanol mixture. The post-etching treatment provides a method to increase the pore size for applications where this feature is desirable.

It was also found that it is beneficial to maintain a constant temperature within the range from about 0° C. to about 99° C. while etching the isolated particles. In other words, a temperature within the range from about 0° C. to about 99° C. is selected and the temperature is maintained during the course of the reaction. By controlling the temperature at which the etching process occurs, the etching rate is controlled.

As an alternative embodiment, the silicon nanosponge particles are dried after the etching process has occurred. In this embodiment of the invention, any drying method known to one of ordinary skill in the art may be employed. In a preferred embodiment, the silicon nanosponge particles are dried by a method selected from the group consisting of: air drying; vacuum drying; supercritical drying; freeze drying; and pentane drying. When the silicon nanosponge particles are dried using the supercritical drying method, the method preferably is done using carbon dioxide.

Typically, the silicon nanosponge particles of the present invention have an outer surface covered by hydrogen atoms, making the particles hydrophobic. In some instances, it may be desirable to change the hydrogen terminated surface. This is accomplished by surface treating the dried silicon nanosponge particles. In one embodiment, the dried silicon nanosponge particles are surface treated by annealing the dried silicon nanosponge particles at a temperature less than about 300° C. This treatment results in the porous silicon nanosponge particles having an oxygen backbone and a hydrogen terminated surface. Alternatively, when the dried silicon nanosponge particles are surface treated by annealing the dried silicon nanosponge particles at a temperature of about 300° C. in air, the hydrogen atoms on the surface are effused and the porous silicon nanosponge particles have a surface mono-layer of oxygen. In yet another embodiment, the dried silicon nanosponge particles are surface treated by annealing the dried silicon nanosponge particles at temperatures greater than about 300° C. In this instance, the porous silicon nanosponge particles undergo oxidation. When the dried silicon nanosponge particles are annealed at a temperature of about 900° C., the porous silicon nanosponge particles undergo complete oxidation, forming porous silica.

As yet another embodiment of the invention, the dried silicon nanosponge particles are surface treated such that the silicon nanosponge particles have at least one surface functional group. The surface treatment enables functionalization of the silicon nanosponge particle, making it reactive to selected chemical compounds. Any compound, element or process known to one of ordinary skill in the art is used to provide the surface functional group or groups, and in particular, the surface functional group is selected from the group consisting of: a halogen, alkenyl, alkyl, organoamine, alkoxy, ester, aldehyde, ketone, carboxylate, and aryl group and combinations thereof.

Figure 4:
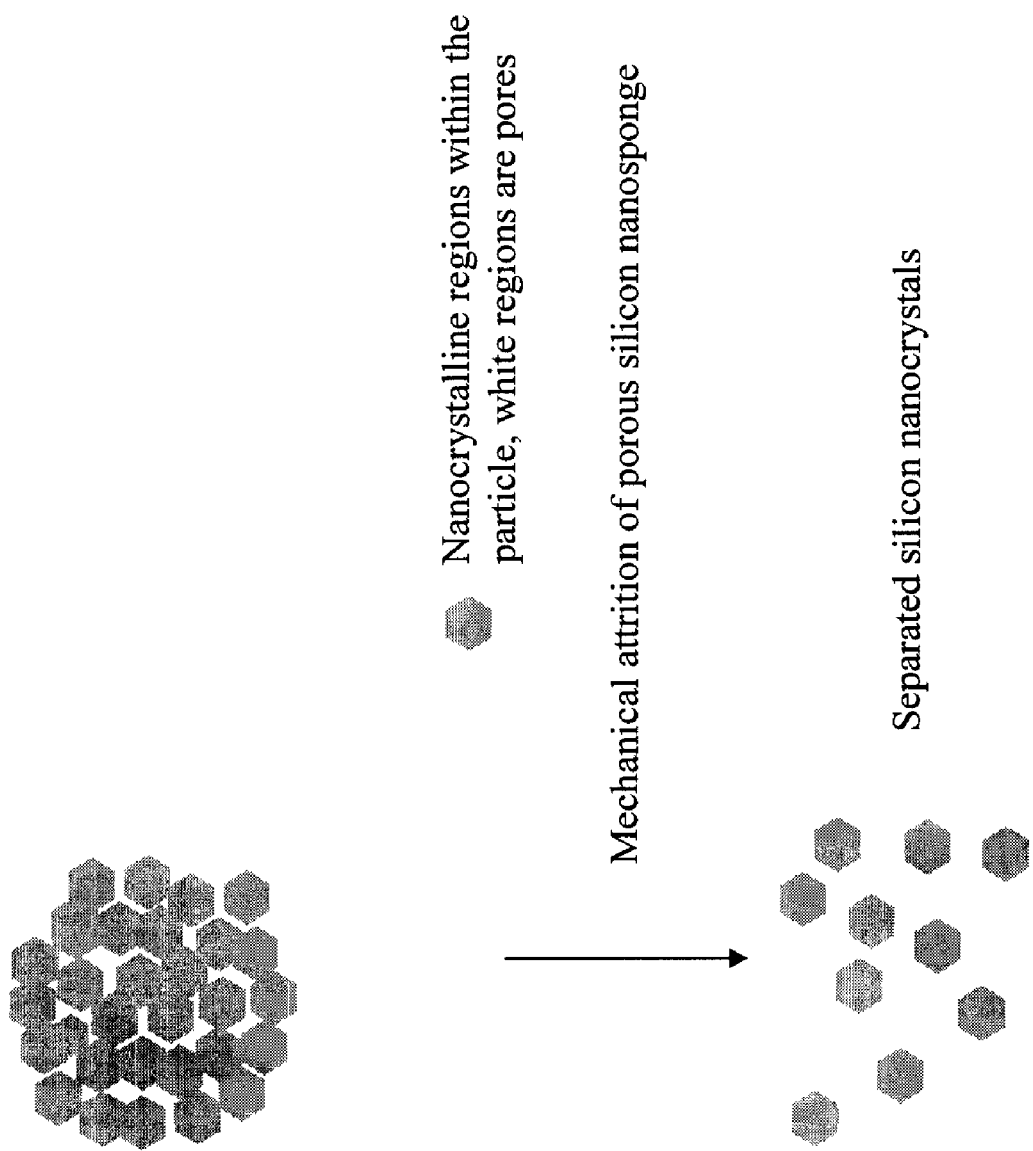
FIG. 4 is a schematic representation of how nanocrystals can be derived from the silicon nanosponge particles of the present invention.

Since each silicon nanosponge particle comprises a plurality of nanocrystals, the silicon nanosponge particle is further milled to produce nanocrystalline particles of silicon. Any method of milling known to one of ordinary skill in the art may be used. Such methods include: attrition by milling in an attritor mill or vibratory mill or by ultrasonic agitation. One preferred method of milling is by attrition as shown in FIG. 4. When subjected to a milling process, each silicon nanosponge particle is broken apart to produce silicon nanocrystals 3-5 nm in size. Since the silicon nanosponge particle is porous throughout the entire particle, the yield of silicon nanocrystals is higher per unit gram of starting silicon powder than that from prior art methods such as Li et al. where the porous region is limited to the surface of the particle.

EXAMPLE

Figure 5:
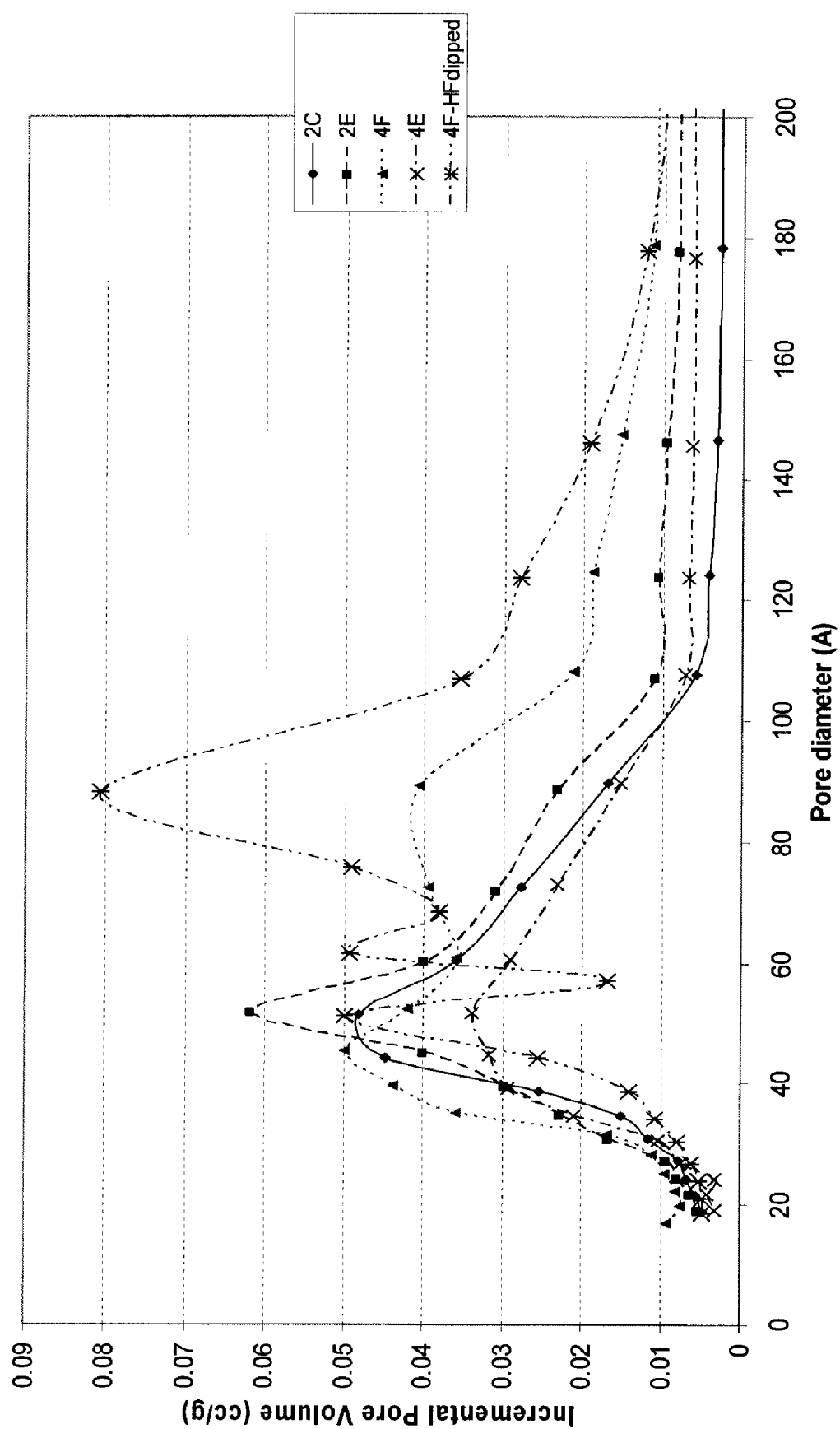
FIG. 5 depicts the pore size distribution for various porous silicon nanosponge particles obtained using the Barret-Joyner-Halenda scheme.

Silicon nanosponge particles were prepared from 2E, 4E and 4F metallurgical grade silicon powders from Vesta Ceramics, AB in Sweden. The metallurgical grade silicon powders were etched with 750 ml of a 48% HF acid with 1000 ml of water in a propylene bath set at a temperature of 27° C. 100 grams of metallurgical grade silicon powder of the selected grade was added to form a mixture, which was mixed thoroughly. An approximately 25% solution was prepared from a 65% $HNO_3$ reagent. Approximately 400 ml of the 25% $HNO_3$ solution was added in steps. The reaction product was checked for photoluminescence with an ultraviolet light. A bright orange emission indicated the formation of nanocrystals within the silicon particles. The reaction was terminated. The powder was collected and dried under vacuum or in air at 70° C. for 24 hours. The Brunauer-Emmet-Teller (BET) surface area was obtained by nitrogen gas adsorption measurements in a Micromeretics ASAP 2010 gas adsorption analyzer. Samples were degassed at 100° C. prior to the measurement. One sample prepared from the 4F metallurgical grade silicon powder was post-etched with a 50% HF-ethanol mixture to increase the pore size. Table 3 provides the BET surface area, pore volume, and average pore diameter for the samples with FIG. 5 depicting the pore size distribution for the samples using the Barret-Joyner-Halenda scheme.

TABLE 3

| | | $N_2$ adsorption | | |
|---|---|---|---|---|
| Sample | Mean Particle size (μ) | BET Surface area $m^2/g$ | Total Pore Volume $cm^3/g$ | Average Pore diameter (nm) |
| 2E-as prepared | 4 | 203 | 0.356 | 5.3 |
| 4E-as prepared | 4 | 142 | 0.252 | 3.5 |
| 4F-as prepared | 2 | 244 | 0.445 | 4.5 |
| 4F-HF-post etched | 2 | 205 | 0.485 | 7.0 |

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. Silicon nanosponge particles prepared from a metallurgical grade silicon powder having a starting composition consisting of from about 98.6 to about 99.0 weight percent Si; from about 0.03 to about 0.50 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent $O_2$; wherein the metallurgical grade silicon powder has an initial particle size ranging from about 1 micron to about 4 microns wherein each silicon nanosponge particle comprises a plurality of nanocrystals with nanopores disposed between the nanocrystals and throughout the entire nanosponge particle; wherein each silicon nanosponge particle has a BET surface area of at least about 142 $m^2/g$; and wherein the pores have an average pore diameter ranging from about 2.0 nm to about 8.0 nm as calculated from nitrogen adsorption isotherm data using the Barret-Joyner-Halenda scheme.

2. Silicon nanosponge particles according to claim 1, wherein the silicon nanosponge particles have at least one surface functional group.

3. Silicon nanosponge particles according to claim 2, wherein the surface functional group is selected from the group consisting of: hydrogen, oxygen, halogen, alkenyl, alkyl, organoamine, alkoxy, ester, aldehyde, ketone, carboxylate, and aryl.

4. Silicon nanosponge particles according to claim 1, prepared by:
   a. providing a metallurgical grade silicon powder having a particle size ranging from about 1 mm to about 3 mm and wherein the metallurgical grade silicon powder has a starting composition consisting of from about 98.6 to about 99.0 weight percent Si; from about 0.03 to about 0.50 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent $O_2$;
   b. treating the metallurgical grade silicon powder to yield silicon particles having particle sizes ranging from about 0.1 microns to about 40 microns;
   c. separating the silicon particles to isolate the silicon particles having sizes ranging from about 1 micron to about 4.0 microns; and
   d. etching the isolated silicon particles to yield silicon nanosponge particles wherein each silicon nanosponge particle comprises a plurality of nanocrystals with nanopores disposed between the nanocrystals and throughout the entire nanosponge particle; wherein each silicon nanosponge particle has a BET surface area of at least about 142 $m^2/g$; and wherein the pores have an average pore diameter ranging from about 2.0 nm to about 8.0 nm as calculated from nitrogen adsorption isotherm data using the Barret-Joyner-Halenda scheme.

5. Silicon nanosponge particles according to claim 4, wherein the isolated silicon particles are stain etched.

6. Silicon nanosponge particles according to claim 5, wherein the isolated silicon particles are stain etched with a solution comprising $HF:HNO_3:H_2O$ at a ratio ranging from about 4:1:20 to about 2:1:10 by weight.

7. Silicon nanosponge particles according to claim 6, wherein the nanocrystal size is determined by the concentration of $HNO_3$.

8. Silicon nanosponge particles according to claim 4, wherein the isolated silicon particles are etched by a vapor phase etching process.

9. Silicon nanosponge particles according to claim 8, wherein the vapor phase etching process comprises etching the isolated silicon particles with moist air saturated with $HF/HNO_3$ vapors.

10. Silicon nanosponge particles according to claim 4, further comprising the step of illuminating the isolated silicon particles during etching.

11. Silicon nanosponge particles according to claim 10, wherein illumination occurs at a wavelength selected from the group consisting of: near infrared, visible, near ultraviolet, far ultraviolet, and extreme ultraviolet radiation.

12. Silicon nanosponge particles according to claim 10, further comprising the step of controlling nanocrystal size by illuminating the isolated silicon particles for a determined length of time and controlling the illumination wavelength.

13. Silicon nanosponge particles according to claim 4, further comprising the step of drying the silicon nanosponge particles.

14. Silicon nanosponge particles according to claim 13, wherein the silicon nanosponge particles are dried by a method selected from the group consisting of: air drying; vacuum drying; supercritical drying; freeze drying; and pentane drying.

15. Silicon nanosponge particles according to claim 13, further comprising the step of surface treating the dried silicon nanosponge particles.

16. Silicon nanosponge particles according to claim 15, wherein the dried silicon nanosponge particles are surface treated by annealing the dried silicon nanosponge particles at a temperature less than about 300° C. wherein the porous silicon nanosponge particles have an oxygen backbone and a hydrogen terminated surface.

17. Silicon nanosponge particles according to claim 15, wherein the dried silicon nanosponge particles are surface treated by annealing the dried silicon nanosponge particles at a temperature of about 300° C. in air wherein surface hydrogen atoms are effused forming a surface mono-layer of oxygen.

18. Silicon nanosponge particles according to claim 15, wherein the dried silicon nanosponge particles are surface treated by annealing the dried silicon nanosponge particles at temperatures greater than about 300° C. wherein the porous silicon nanosponge particles undergo oxidation.

19. Silicon nanosponge particles according to claim 18, wherein the dried silicon nanosponge particles are annealed at a temperature of about 900° C. wherein the porous silicon nanosponge particles undergo complete oxidation, forming porous silica.

20. Silicon nanosponge particles according to claim 15, wherein the dried silicon nanosponge particles are surface treated to provide silicon nanosponge particles having at least one surface functional group.

21. Silicon nanosponge particles according to claim 20, wherein the surface functional group is selected from the group consisting of: hydrogen, oxygen, halogen, alkenyl, alkyl, organoamine, alkoxy, ester, aldehyde, ketone, carboxylate, and aryl group.

22. A method for producing silicon nanosponge particles according to claim 1, the method comprising the steps of:
   a. providing metallurgical grade silicon powder having a particle size ranging from about 1 mm to about 3 mm and wherein the metallurgical grade silicon powder has a starting composition consisting of from about 98.6 to about 99.0 weight percent Si; from about 0.03 to about 0.50 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent $O_2$;
   b. treating the silicon powder to yield silicon particles having particle sizes ranging form about 0.1 microns to about 40 microns;
   c. separating the silicon particles to isolate the silicon particles having a particle size ranging from about 1 micron to about 4 microns; and
   d. etching the isolated silicon particles to yield silicon nanosponge particles, each silicon nanosponge particle comprising a plurality of nanocrystals with pores disposed between the nanocrystals and throughout the entire silicon nanosponge particle; wherein each silicon nanosponge particle has a BET surface area of at least about 142 $m^2/g$; and wherein the pores have an average pore diameter ranging from about 2.0 nm to about 8.0 nm as calculated from nitrogen adsorption isotherm data using the Barret-Joyner-Halenda scheme.

23. A method according to claim 22, wherein the silicon powder is treated by jet-milling.

24. A method according to claim 22, wherein the isolated silicon particles are stain etched.

25. A method according to claim 24, wherein the isolated silicon particles are stain etched with a solution comprising $HF:HNO_3:H_2O$ at a ratio ranging from about 4:1:20 to about 2:1:10 by weight.

26. A method according to claim 25, wherein the nanocrystal size is determined by the concentration of $HNO_3$.

27. A method according to claim 22, wherein the isolated silicon particles are vapor phase etched with moist air saturated with $HF/HNO_3$ vapors.

28. A method according to claim 22, further comprising the step of maintaining a constant temperature while etching the isolated silicon particles, wherein the constant temperature is selected from the range from about 0° C. to about 99° C.

29. A method according to claim 22, further comprising the step of illuminating the isolated silicon particles during etching.

30. A method according to claim 29, wherein illumination occurs at a wavelength selected from the group consisting of: near infrared, visible, near ultraviolet, far ultraviolet, and extreme ultraviolet radiation.

31. A method according to claim 29, further comprising the step of controlling nanocrystal size by illuminating the isolated silicon particles for a determined length of time and controlling the illumination wavelength.

32. A method according to claim 22, further comprising the step of etching the porous silicon nanosponge particles with a 50% by weight solution of hydrofluoric acid and ethanol.

33. A method according to claim 22, wherein the silicon nanosponge particles are milled to yield nanocrystalline silicon particles.

34. A method according to claim 22, further comprising the step of drying the silicon nanosponge particles.

35. A method according to claim 34, wherein the silicon nanosponge particles are dried by a method selected from the group consisting of: air drying; vacuum drying, supercritical drying; freeze drying; and pentane drying.

36. A method according to claim 34, further comprising the step of surface treating the dried silicon nanosponge particles.

37. A method according to claim 36, wherein the dried silicon nanosponge particles are surface treated by annealing the dried silicon nanosponge particles at a temperature less than about 300° C. wherein the porous silicon nanosponge particles have an oxygen backbone and a hydrogen terminated surface.

38. A method according to claim 36, wherein the dried silicon nanosponge particles are surface treated by annealing the dried silicon nanosponge particles at a temperature of about 300° C. in air wherein surface hydrogen atoms are effused forming a surface mono-layer of oxygen.

39. A method according to claim 36, wherein the dried silicon nanosponge particles are surface treated by annealing the dried silicon nanosponge particles at temperatures greater than about 300° C. wherein the porous silicon nanosponge particles undergo oxidation.

40. A method according to claim 39, wherein the dried silicon nanosponge particles are annealed at a temperature of about 900° C. wherein the porous silicon nanosponge particles undergo complete oxidation, forming porous silica.

41. A method according to claim 36, wherein the dried silicon nanosponge particles are surface treated to provide silicon nanosponge particles having at least one surface functional group.

42. A method according to claim 41, wherein the surface functional group is selected from the group consisting of: hydrogen, oxygen, halogen, alkenyl, alkyl, organoamine, alkoxy, ester, aldehyde, ketone, carboxylate, and aryl group.

43. A method for producing silicon nanosponge particles according to claim 1, the method comprising the steps of:
   a. providing metallurgical grade silicon powder having a particle size ranging from about 1 mm to about 3 mm and wherein the metallurgical grade silicon powder has a starting composition consisting of from about 98.6 to about 99.0 weight percent Si; from about 0.03 to about 0.50 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent $O_2$;
   b. jet milling the silicon powder to yield a powder having a particle size ranging from about 0.1 microns to about 40 microns;
   c. separating the silicon particles to isolate the particles having a particle size ranging from about 1 micron to about 4 microns; and
   d. stain etching the isolated particles with a solution comprising $HF:HNO_3:H_2O$ at a ratio ranging from about 4:1:20 to about 2:1:10 by weight to yield silicon nanosponge particles, wherein each silicon nanosponge particle comprises a plurality of nanocrystals with pores disposed between the nanocrystals and throughout the entire silicon nanosponge particle; wherein each silicon nanosponge particle has a BET surface area of at least about 142 $m^2/g$; and wherein the pores have an average pore diameter ranging from about 2.0 nm to about 8.0 nm as calculated from nitrogen adsorption isotherm data using the Barret-Joyner-Halenda scheme.

* * * * *